June 30, 1970  J. M. TANENBAUM  3,517,538
APPARATUS FOR SEPARATING THE FLANGES OF LARGE
STRUCTURAL CHANNELS Filed June 3, 1968  2 Sheets-Sheet 1

INVENTOR
JOSEPH M. TANENBAUM
Attorney

INVENTOR
JOSEPH M. TANENBAUM
Attorney

United States Patent Office 3,517,538
Patented June 30, 1970

3,517,538
APPARATUS FOR SEPARATING THE FLANGES OF LARGE STRUCTURAL CHANNELS
Joseph Manuel Tanenbaum, 4 Dewborne Ave.,
Toronto 10, Ontario, Canada
Filed June 3, 1968, Ser. No. 734,107
Int. Cl. B21d 7/00
U.S. Cl. 72—389                                     9 Claims

ABSTRACT OF THE DISCLOSURE

An apparatus for separating the flanges of distorted large channel sections to insert transverse stiffening members. A frame, riding on the edges of the flanges, carries a pair of blocks which depend into the channel; one block bears against the inside of one flange and the other block has a piston which is moved against the inside of the other flange to effect separation. The thrust exerted during separation is borne by a reinforcing tube which connects the two blocks.

BACKGROUND OF THE INVENTION

Field of the invention

This invention relates to the insertion of stiffening members in the channel portion of structural metal shapes, such as I beams which structural shapes are constructed from plates assembled together by welding along their lengths, the stiffening members being welded into position after insertion.

Description of the prior art

It is now common practice to form large metal structural components, such as I beams and channels, from plates which are assembled together by automatic welding. Frequently stiffeners are inserted, for instance, into the channels of an I beam and then welded to provide added rigidity and also a key for the surrounding concrete. However, during the welding process the temperature difference created between the welded zone and the adjoining plates produces distortion, with the result that the component has to be straightened before the stiffeners can be inserted. Furthermore, a structural I beam may have a web as wide as twelve feet, which is usually much thinner than the flanges; hence bowing of the web takes place with consequent relative inward movement of the flanges with need for subsequent straightening to insert stiffeners.

One practice which has been adopted to straighten out the walls of the channels of large welded structural components is to insert a block, after which wedges are driven between the channel wall and the block; this operation has the advantage of being slow and also the localized application of the wedge and block generally fails to bring into line the base of the channel or the web of the I beam.

SUMMARY OF THE INVENTION

It is an object of the invention to provide apparatus which will straighten the walls of distorted large structural welded components, such as channels and I beams, to permit the insertion of spaced apart stiffening members which will then be welded into position.

The apparatus of the invention includes a frame form of a pair of spaced apart beams secured together by cross members which are adjustable in length; the beams each have a pair of spaced apart rollers which ride on the edges of the channel of the welded component. Means acting on the rollers are provided to propel the frame along the channel with guide means to keep the rollers on the edges. Depending into the channel from the frame are a pair of spaced apart members, one of which bears against one wall of the channel; the other member carries at least one piston which on activation moves against the other channel wall to effect the requisite straightening. Support for the depending members on action of the piston is provided by a reinforcing member located transversely in the channel, which reinforcing member connects the depending members.

It has been found that straightening of the channel walls of an I beam with the apparatus described above will often lead to rectification in itself of the web of the beam. In very large components, the distortion due to welding is accentuated by bowing of the web. To correct the gravity drop of the web of large channels and I beams, it is found advantageous to support the web by a piston and cylinder structure, the action of the piston being directed against the underside of the web.

BRIEF DESCRIPTION OF THE DRAWINGS

The invention will now be described in relation to the accompanying drawings, in which—

DESCRIPTION OF THE PREFERRED EMBODIMENT

Figure 1:
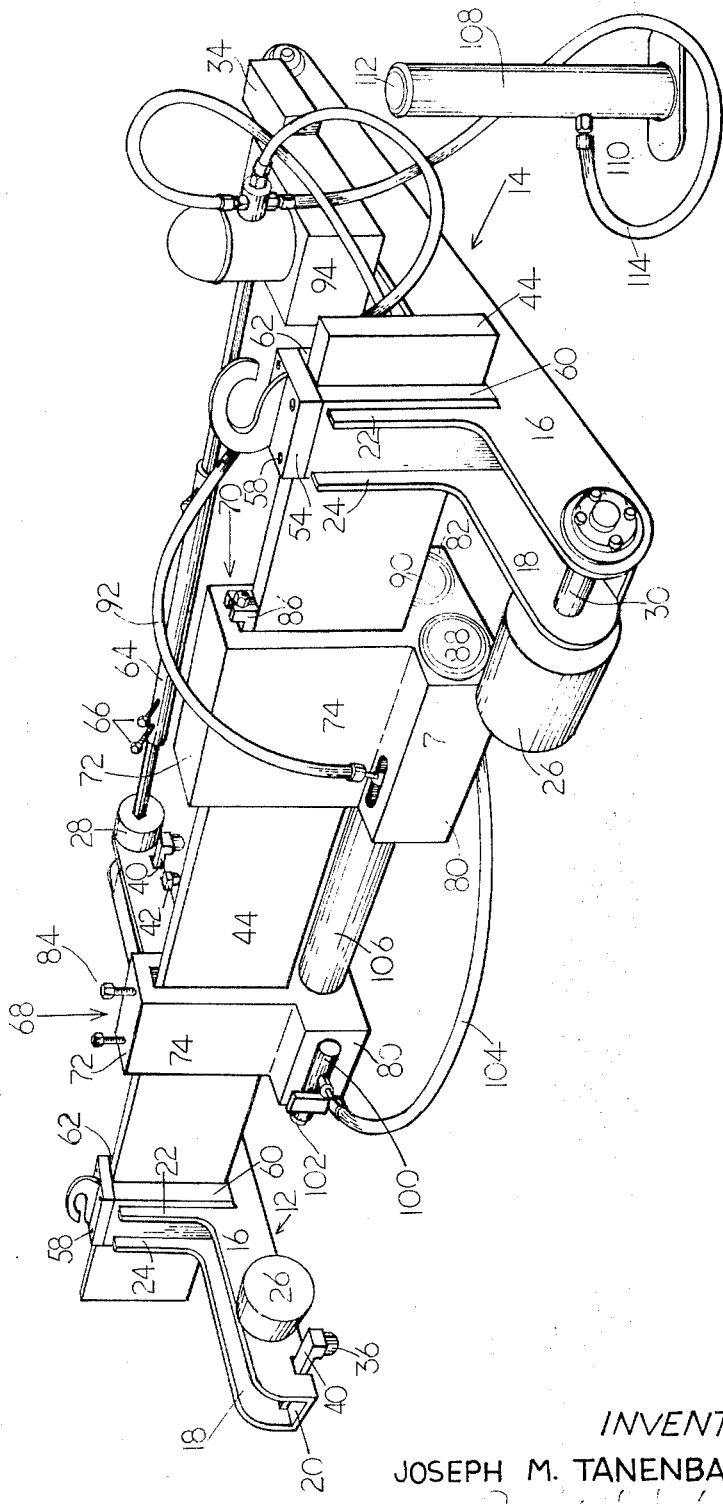
FIG. 1 is a perspective view of a preferred embodiment of the invention.

The apparatus illustrated in the drawings comprises a frame generally indicated with the numeral 10, which includes a pair of spaced apart members 12 and 14, only one of which will be described as they are similar in construction. The member 12 is preferably formed of a channel having side walls 16 and 18 connected by a base 20. At the same position intermediate of the ends of the member 12 are a pair of extensions 22 and 24, which extend upwardly from the side walls 16 and 18, respectively.

The members 12 and 14 each have a pair of spaced apart rollers 26 and 28, which are journalled on horizontally disposed axles 30 and 32 traversing the side walls 16 and 18. The frame 10 carries an electric motor 34, which is geared to drive the roller 28 on the member 12. The member 12 also has two pairs of guide rollers 36 and 38, which are carried on the ends of arms 40 and 42, extending from the channel wall 16 in the same direction as the rollers 28 and 30. The guide rollers 36 and 38 are positioned in a plane below the rollers 28 and 30 and they are offset one to the other with respect to a vertical plane parallel to the side wall 16.

Connecting the spaced apart members 12 and 14 and normally disposed thereto is a beam 44 forming one side of the frame 10. The beam 44 slidably rests in the slots of extensions 22 and 24.

The distance apart of the channel members 12 and 14 may be adjusted by sliding them along the rectangular beam 44 so that the rollers 28 and 30 which extend inwards of the frame 10 rest on the edges of flanges 46 and 48 of an I beam 50, the web 52 of which lies in a substantially horizontal plane. The offset guide rollers 36 and 38 ensure that the rollers 28 and 30 remain on the edges of I beam 50 when the roller 28 is activated by the electric motor 34 to propel the frame 10 along I beam 50.

The rectangular beam 44 is secured to the members 12 and 14 by means of a pair of plates 54 and 56, respectively, which are positioned over the extensions 22 and 24 and held thereto by screws 58. To provide added rigidity the plates 54 and 56 each have integral slotted arms 60 and 62 which bear against the side of the extensions 22 and 24.

The axle 32 in each member 12 and 14 extends inwards of the side walls 16 being connected by a tubular sleeve 64 thus forming the side of the frame 10, opposed to the rectangular beam 44. The sleeve 64 is secured to the extensions of the axles 32 by means of screws 66 which may be released to permit the adjustment, as already described, of the width of the channel members 12 and 14 on the rectangular beam 44.

Depending downwards from the beam 44 between the flanges 46 and 48 of the I beam 50 are a pair of spaced apart rectangular shaped sleeves 68 and 70, only one of which will be described as they are of similar construction. The sleeve 68 is formed of a top plate 72, normally disposed integral side walls 74 and 76 and an integral base 78 which is enlarged by abutments 80 and 82.

The sleeves 68 and 70 are adjustably disposed on the beam 44, the sleeves 68 being secured thereto for rapid adjustment by screws 84, whereas sleeves 70 is shown as more permanently secured by means of wedges 86.

The abutments 80 and 82 of the sleeve 70 each has an individually disposed piston 88 and 90, the free ends of which are adjacent to the flange 46 of the I beam 50. The pistons 88 and 90 are activated through a fluid line 92 supplied by a pump 94 carried on the member 14.

Each abutment 80 and 82 of the sleeve 68 has a short individual projection 96 and 98, which extends towards the adjacent inner side of the flange 48 of the I beam 50. The projections 96 and 98 are shown to be substantially circular in cross section though other configurations may be employed and the surface of their free ends is preferably serrated to provide a more effective bite when they contact the flange 48 on movement of the sleeve 68 along the beam 44 in a direction towards the flange 48.

Figure 3:
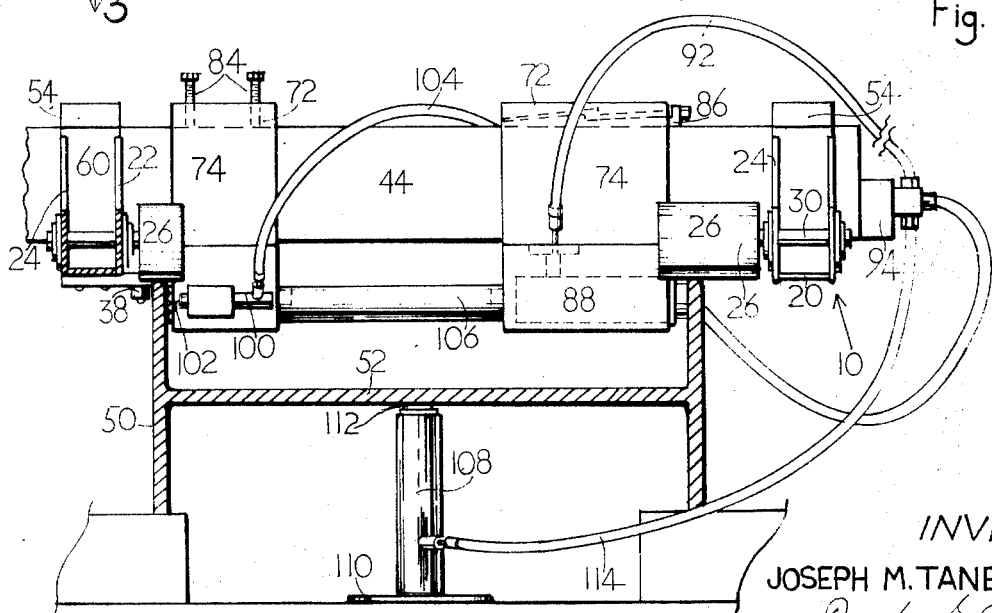
FIG. 3 is a sectional view taken on the line 3—3 of FIG. 2.

It will be observed from FIG. 3 that the abutment 80 of the sleeve 68 carries a small cylinder 100 with enclosed piston 102 actuated through an individual fluid line 104. The purpose of the cylinder 100 and piston 102 is to provide sufficient release of the projections 96 and 98 from the flange 48. The piston 102 may be extended to contact the flange 48 and provide the requisite back pressure for the sleeve 68.

It is important feature of the invention that the bases 78 of each sleeve 68 and 70 are connected by a reinforcing member 106, which is preferably made of a tube and is located on the centre line of the direction of thrust of the pistons 88 and 90.

The auxiliary piece of equipment to the apparatus already described is more particularly illustrated in FIG. 3. This comprises a portable cylinder 108 which is mounted on a base 110. The cylinder 108 carries a piston 112 which is activated by a fluid line 114 supplied by the pump 94. As illustrated in FIG. 3 the cylinder 108 is mounted vertically below the web 52 of the I beam 50 with the free end of the piston 112 bearing against the web 52.

Figure 2:
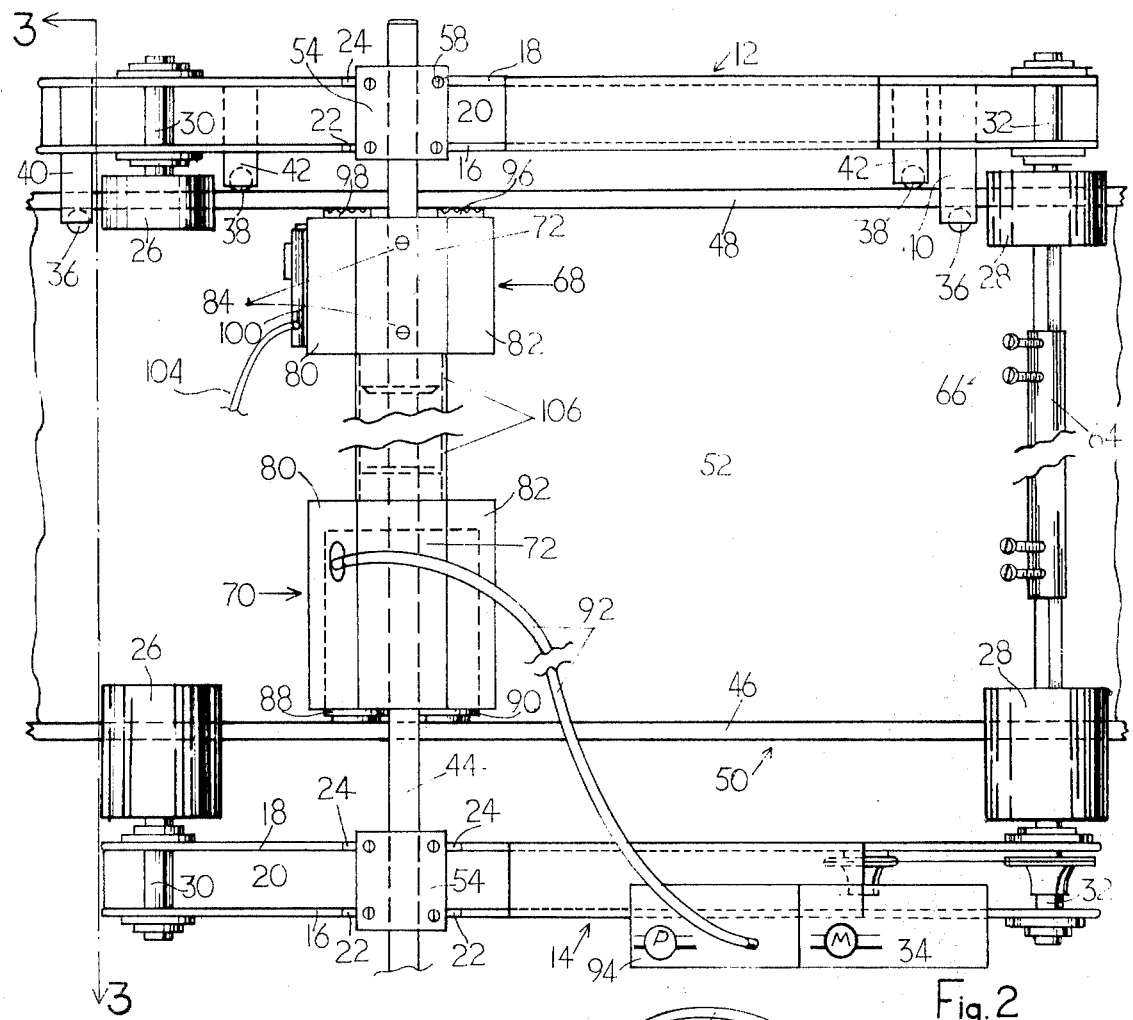
FIG. 2 is a plan view of the embodiment shown in FIG. 1.

The operation of the apparatus described above is as follows, being more particularly illustrated in FIGS. 2 and 3. In order to straighten the flanges 46 and 48 of the I beam 50, the latter is positioned so that the web 52 lies in a substantially horizontal plane. The frame 10 which may be lifted by means of hooks 116 is then placed over the I beam 50, so that on adjustment of the width apart of the members 12 and 14 the rollers 26 and 28 rest on the edges of the flanges 46 and 48 of the I beam 50. Furthermore, the offset guide rollers 36 and 38 are disposed on opposite sides of the flange 46 to ensure that the rollers 28 and 30 remain on the edges of the flanges 46 and 48 of the I beam 50, when the frame 10 is moved thereon.

After the frame 10 has been placed on the I beam 50 the position of the sleeve 68 is adjusted so that the individual serrated projections 96 and 98 bear against the inner side of the flange 48.

The pistons 88 and 90 in the sleeve 70 are then actuated through the fluid line 92 towards the flange 46 of the I beam 50 to effect the necessary straightening of the flanges 46 and 48. When this has been accomplished a stiffening member 116 is then inserted between the flanges 46 and 48. The stiffening member 116 is held against the side of each abutment 82 of the members 68 and 70 so as to be positioned transversely with respect to flanges 46 and 48, after which the stiffening member 116 is welded into position.

The pistons 88 and 90 are then withdrawn and the small piston 102 carried on the exterior of the sleeve 68 is actuated to effect sufficient release of the projections 96 and 98 from the flange 48. The electric motor 34 is then switched on to drive the rollers 28 and the frame 10 is then carried along the I beam 50 to a new position on which the process is then repeated.

It has already been mentioned that straightening of the flanges 46 and 48 of the I beam 50 by means of the apparatus is frequently sufficient to effect requisite strengthening of the web 52; however in severe cases of distortion, the auxiliary piece of equipment comprising the portable cylinder 108 an enclosed piston 112 is placed below the web 52 and the piston 112 is activated so that its free end bears against the web 52 and assists the necessary correction in conjunction with that performed at the same time on the flanges 46 and 48.

The apparatus of the invention effects a rapid correction of the distortion which occurs in welded structural components, such as channels of I beam so that stiffeners may be subsequently inserted which are then welded into position.

What I claim for my invention is:

1. Apparatus for straightening the channel of a distorted large structural component comprising a frame formed of a pair of spaced apart members, a cross member securing said spaced apart members, said cross member supporting a pair of members depending into said channel, a reinforcing member in said channel connecting said depending members, one of said depending members bearing against one wall of said channel, the other of said depending members having at least one piston and means for activating said piston against the other wall of said channel to effect the requisite straightening.

2. Apparatus according to claim 1, wherein said spaced apart members are adjustably positioned on said cross member.

3. Apparatus according to claim 1 wherein said spaced apart members have rollers which ride on the edges of said channel of said structural component.

4. Apparatus according to claim 3 wherein means are provided to propel said apparatus along said component through said rollers.

5. Apparatus according to claim 4 wherein guide rollers are secured to one of said spaced apart members, said guide rollers being offset one in relation to the other to lie on opposite sides of the edge of said channel adjacent to said one of said spaced apart members.

6. Apparatus according to claim 1 wherein pressure means are provided on the side of said one of said depending members, such pressure means being movable towards said one wall to release said one of said depending members.

7. Apparatus according to claim 1 wherein said dependent members are adjustably positioned on said cross members.

8. Apparatus according to claim 1 wherein said reinforcing member is a tube.

9. Apparatus according to claim 1 wherein said other of said depending member has a pair of spaced apart pistons and said reinforcing member is secured to said depending members intermediate of the line of thrust of said pistons.

References Cited
UNITED STATES PATENTS

| 1,121,629 | 12/1914 | Hoge | 72—454 |
| 2,442,425 | 6/1948 | Merrill | 72—389 |
| 2,587,324 | 2/1952 | Hursh | 104—12 |
| 2,727,557 | 12/1955 | Fox | 72—389 |

CHARLES W. LANHAM, Primary Examiner

G. P. CROSBY, Assistant Examiner

U.S. Cl. X.R.

72—453